(12) United States Patent
Lim et al.

(10) Patent No.: US 8,740,635 B2
(45) Date of Patent: Jun. 3, 2014

(54) CARD CONNECTOR HAVING AN ACTUATOR ENGAGING A LOCKING ELEMENT

(75) Inventors: Kian Heng Lim, Singapore (SG); Chiu-Ming Lu, Lisle, IL (US)

(73) Assignee: Molex Incorporated, Lisle, IL (US)

(*) Notice: Subject to any disclaimer, the term of this patent is extended or adjusted under 35 U.S.C. 154(b) by 21 days.

(21) Appl. No.: 13/539,974

(22) Filed: Jul. 2, 2012

(65) Prior Publication Data

US 2013/0005166 A1 Jan. 3, 2013

(30) Foreign Application Priority Data

Jun. 30, 2011 (SG) ................................ 201104845-1
Jun. 30, 2011 (SG) ................................ 201104846-9

(51) Int. Cl.
*H01R 13/00* (2006.01)

(52) U.S. Cl.
USPC ........................................................ 439/159

(58) Field of Classification Search
USPC ................................................. 439/152–159
See application file for complete search history.

(56) References Cited

U.S. PATENT DOCUMENTS

| 6,648,660 | B2* | 11/2003 | Sato et al. | 439/159 |
| 6,652,299 | B2* | 11/2003 | Sato | 439/159 |
| 6,802,726 | B2* | 10/2004 | Chang | 439/159 |
| 6,839,431 | B2* | 1/2005 | Ooya et al. | 379/433.09 |
| 6,840,786 | B2* | 1/2005 | Sato et al. | 439/159 |
| 7,766,678 | B1 | 8/2010 | Abe | |
| 2010/0055985 | A1 | 3/2010 | Hu et al. | |

FOREIGN PATENT DOCUMENTS

| CN | 101154775 A | 4/2008 |
| CN | 201323258 Y | 10/2009 |
| TW | M376945 | 3/2010 |

* cited by examiner

*Primary Examiner* — Chandrika Prasad
(74) *Attorney, Agent, or Firm* — Stephen L. Sheldon

(57) ABSTRACT

A card connector includes a tray having a side wall and a breach region formed on the side wall, a main body including a front opening for inserting the tray and a side portion defining a side of the front opening, a plurality of terminals attached to the main body, and a detective switch including a spring member that is attached to the side portion of the main body and includes a press portion configured to extend into the card-holding space of the tray through the breach region of the tray when the tray is inserted in the main body. A card connector can include a card locking element, and a card ejecting mechanism. The card ejecting mechanism can comprise an actuator movable between an outward position and an inward position and a levering member.

21 Claims, 17 Drawing Sheets

CARD CONNECTOR HAVING AN ACTUATOR ENGAGING A LOCKING ELEMENT

RELATED APPLICATIONS

This application claims priority to Singapore Application No. 201104845-1, filed Jun. 30, 2011, and to Singapore Application No. 201104846-9, filed Jun. 30, 2011, both of which are incorporated herein by reference in their entirety.

TECHNICAL FIELD

The present invention relates to a card connector, and relates more particularly to a SIM (subscriber identity module) card connector.

BACKGROUND ART

Mobile communication devices such as mobile phones and portable computers generally use a SIM (subscriber identity module or subscriber identification module) card to store network-specific information used to authenticate and identify subscribers on the network. Most important of the network-specific information are ICCID (integrated circuit card identifier), IMSI (international mobile subscriber identity), authentication key (Ki), local area identity (LAI), and operator-specific emergency number.

SIM cards are connected to mobile communication devices through SIM card connectors. FIG. 1A shows a first embodiment of a conventional SIM card connector 1. The SIM card connector 1 has an insulating housing 11 having a card receiving space, a metal shield 16 assembled to the insulating housing 11, a card receiving mechanism 14 insertable into the card receiving space, a pair of elastic pieces 12 having locking portions 121 for retaining the card receiving mechanism 14, a lengthwise arm 13 having two bent flexible arms 132, and a terminal module 15 disposed in the insulating housing 11. The elastic piece 12 generates low retaining force, insufficient to retain the card receiving mechanism 14. To hold the card receiving mechanism 14 more securely, the lengthwise arm 13 is introduced.

The lengthwise arm 13 has two bent flexible arms 132 corresponding to the pair of elastic pieces 12. When the card receiving mechanism 14 is inserted, the card receiving mechanism 14 presses the U-shaped portion of each elastic piece 12 and moves the U-shaped portion of each elastic piece 12 outward. The tip of each elastic piece 12 contacts the respective flexible arm 132 such that additional retaining force is applied to the card receiving mechanism 14. However, the SIM card connector 1 uses too many elastic components to retain the card receiving mechanism 14, consuming too much interior space of the SIM card connector 1 for accommodating these components. In addition, although employing the lengthwise arm 13 can increase retaining force, these elastic components still are not sufficiently strong to firmly hold the card receiving mechanism 14, and are unable to prevent the card receiving mechanism 14 from being accidently removed.

FIG. 1B shows another type of conventional SIM card connector used in the industry. The SIM card connector 1', disclosed in U.S. Patent Publication No. 2010/0055985A1, includes an insulating housing 11', a terminal module 12' having a plurality of contacts 121', a metal shield 15', a switch element 13', and a card receiving mechanism 14'. The metal shield 15' can be assembled on and partly cover the insulating housing 11'. The metal shield 15' and the insulating housing 11' define a card receiving space. The card receiving mechanism 14' can carry a SIM card and is insertable into the card receiving space. The switch element 13' comprises a movable piece 131' and a stationary piece 132', wherein the stationary piece 132' contacts the movable piece 131' when the card receiving mechanism 14' is not inserted. The movable piece 131' has an arch portion, which protrudes into the card receiving space to contact an inserted card receiving mechanism 14'. When a card receiving mechanism 14' is inserted, the movable piece 132' is pushed away from the stationary piece 131', triggering a card insertion signal.

FIGS. 2A and 2B show another conventional SIM card connector 2. The conventional SIM card connector 2 has a housing 20 having an internal housing part for receiving an IC card 22 therein. A slide member 21 having a shaft part slides beside the internal housing part. An eject arm 23 has a shaft hole formed at the center of the eject arm 23. The shaft part of the slide member 21 is fitted into the shaft hole of the eject arm 23 in such a way that allows the eject arm 23 to rotate around the shaft part of the slide member 21. The eject arm 23 has first and second arm parts 23a and 23b extending outward from the disk-like portion of the eject arm 23. The first arm part 23a is provided for engaging the front end of the IC card 22 to rotate the eject arm 23 when the IC card 22 is being inserted. The second arm part 23b has a tip portion having a circular shape for engaging with the concave part 221 formed at one side of the IC card 22.

Because the second arm part 23b is moved by swinging motion, the concave part 221 of the IC card 22 must be made larger so the second arm part 23b does not interfere with the IC card 22 when the IC card 22 is being inserted. However, the large concave part 221 causes an inserted IC card 22 to be loose, as shown in FIG. 2B, and unable to be securely held. In addition, the card ejecting and locking mechanism of the conventional SIM card connector 2 includes too many components and is too complex, resulting in high manufacturing cost. Consequentially, certain individual would appreciate a new card connector.

SUMMARY OF THE INVENTION

In one embodiment, a card connector comprises a main body having a receiving space, a plurality of terminals attached to the main body, a card locking element, and a card ejecting mechanism. The card locking element includes a locking portion, an operating portion, and a first interacting portion. The locking portion is configured to be located in the receiving space when the card locking element is in a locking position. The card ejecting mechanism comprises an actuator movable between an outward position and an inward position and a levering member pivoted adjacent to the rear of the receiving space. The actuator includes a second interacting portion configured to engage with the first interacting portion for linked movement of the card locking element and the actuator. The levering member includes a first arm part and a second arm part. The second arm part includes a second end section extending adjacent to the operating portion of the card locking element. The first arm part includes a first end portion that can be swung into the receiving space when the second end section is pushed by the operating portion of the card locking element. The first and second interacting portions allow the movement of the card locking element between the locking position and an unlocking position simultaneous with the movement of the actuator between the outward position and the inward position.

In another embodiment, a card connector comprises a tray, a main body, a plurality of terminals, and a detective switch. The tray includes a side wall for defining a card-holding space and a breach region formed on the side wall. The main body includes a front opening for inserting the tray and a side portion defining a side of the front opening. The plurality of terminals are attached to the main body. The detective switch includes a spring member. The spring member is attached to the side portion of the main body and includes a press portion configured to extend into the card-holding space of the tray through the breach region of the tray when the tray is inserted in the main body. The breach region is configured to prevent interference between the press portion and the tray during the insertion of the tray.

In another embodiment, a card connector comprises a tray having a notch, a main body having a receiving space for receiving the tray, a plurality of terminals attached to the main body, a card locking element, and a card ejecting mechanism. The card locking element includes a locking portion, an operating portion, and a first interacting portion. The locking portion is configured to be in the notch when the card locking element is in a locking position. The card ejecting mechanism comprises an actuator movable between an outward position and an inward position and a levering member pivoted adjacent to the rear of the receiving space. The actuator comprises a second interacting portion configured to engage with the first interacting portion for linked movement of the card locking element and the actuator. The levering member includes a first arm part and a second arm part. The second arm part includes a second end section extending adjacent to the operating portion of the card locking element. The first arm part includes a first end portion that can be swung into the receiving space when the second end section is pushed by the operating portion of the card locking element. The first and second interacting portions allow the movement of the card locking element between the locking position and an unlocking position simultaneous with the movement of the actuator between the outward position and the inward position.

In another embodiment, a card connector comprises a tray, a main body, a plurality of terminals, and a detective switch. The tray includes a side wall for defining a card-holding space for receiving an electrical card and a breach region formed on the side wall. The main body includes a front opening for inserting the tray and a side portion defining a side of the front opening. The plurality of terminals are attached to the main body. The detective switch includes a spring member. The spring member is attached to the side portion of the main body and includes a press portion. The breach region is configured to prevent interference between the press portion and the tray during the insertion of the tray. The breach region also reveals a corner portion of the electrical card to allow the corner portion of the electrical card to contact the press portion.

BRIEF DESCRIPTION OF THE DRAWINGS

The present invention is illustrated by way of example and not limited in the accompanying figures in which like reference numerals indicate similar elements and in which.

DETAILED DESCRIPTION OF THE PREFERRED EMBODIMENTS

Hereinafter, embodiments of the present invention are described in detail with reference to the attached drawings. The detailed description that follows describes exemplary embodiments and is not intended to be limited to the expressly disclosed combination(s). Therefore, unless otherwise noted, features disclosed herein may be combined together to form additional combinations that were not otherwise shown for purposes of brevity.

Figure 1A:
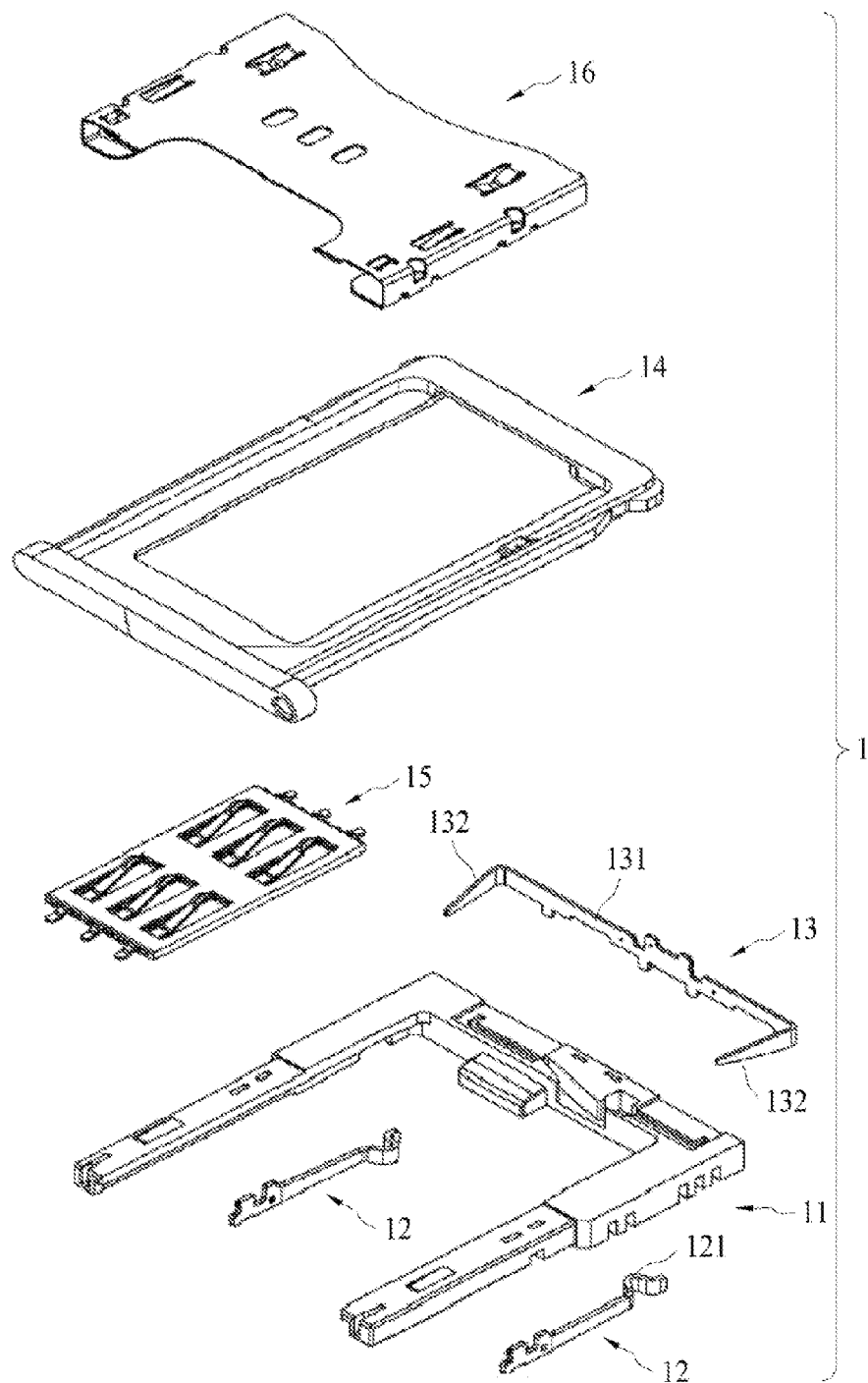
FIG. 1A and 1B show a conventional SIM card connector.
Figure 1B:
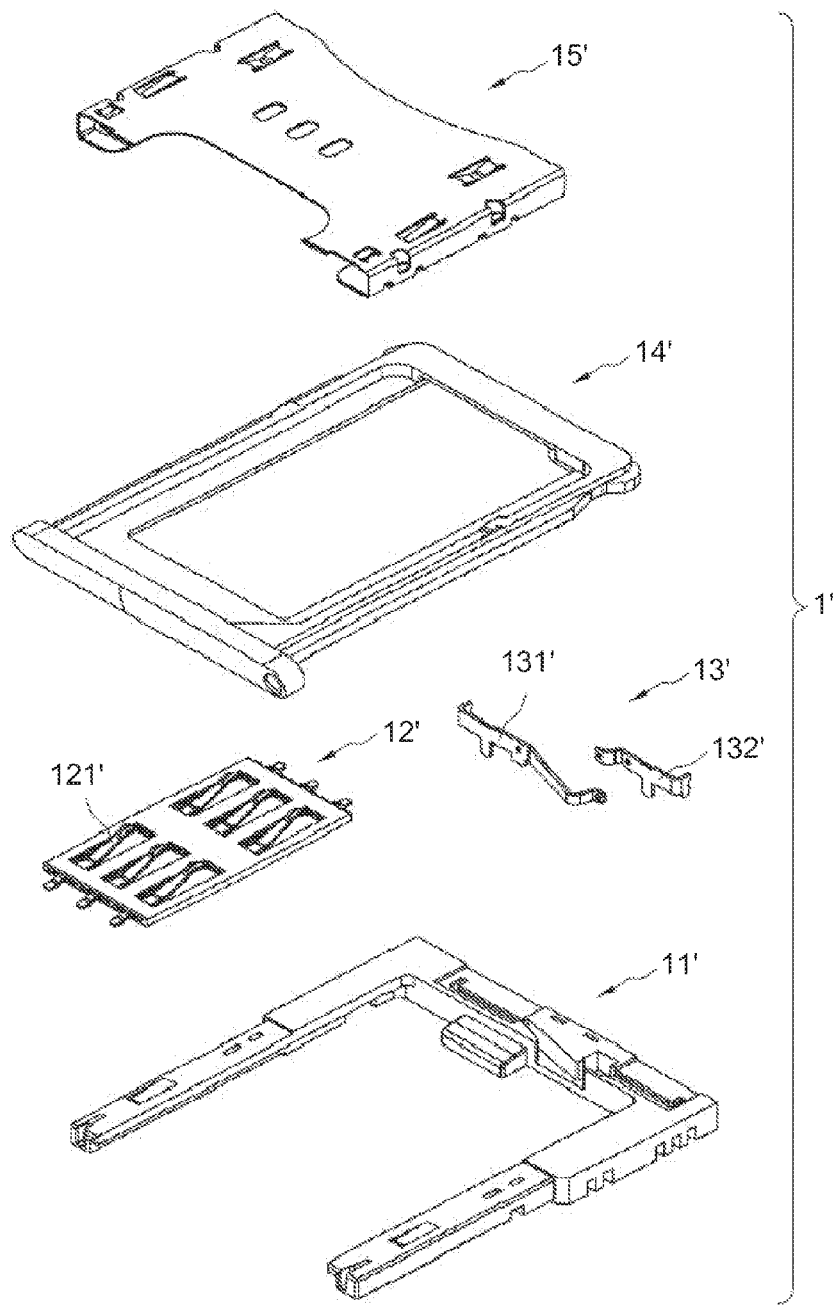
Figure 2A:
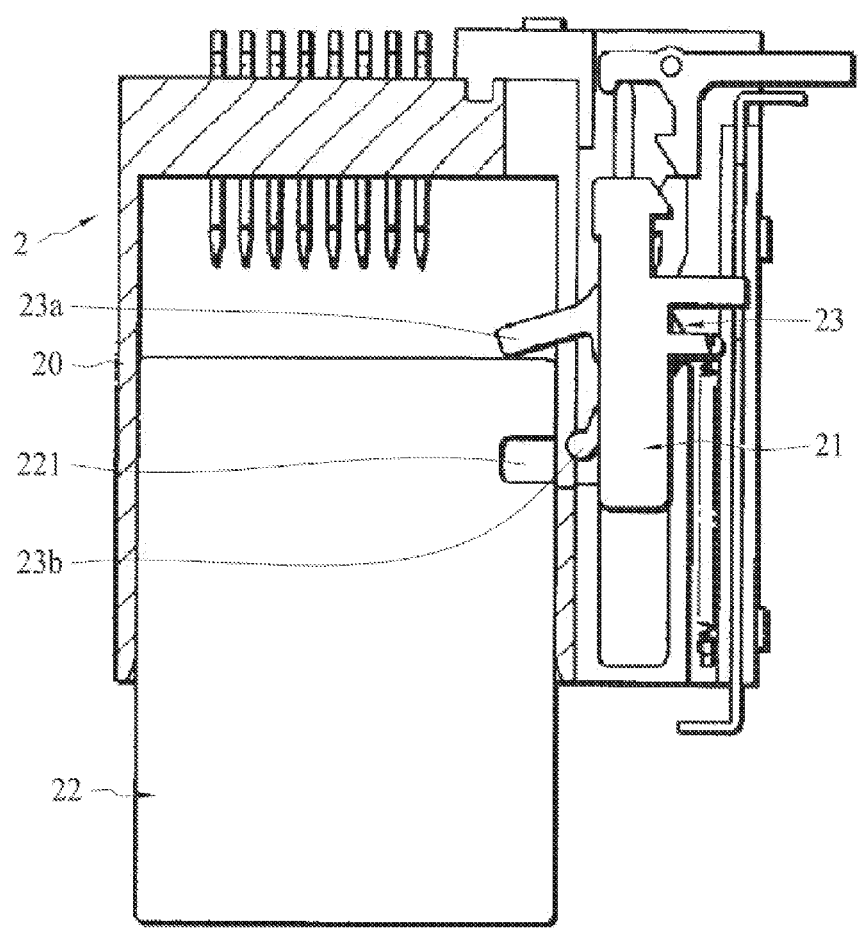
FIGS. 2A and 2B show another conventional SIM card connector.
Figure 2B:
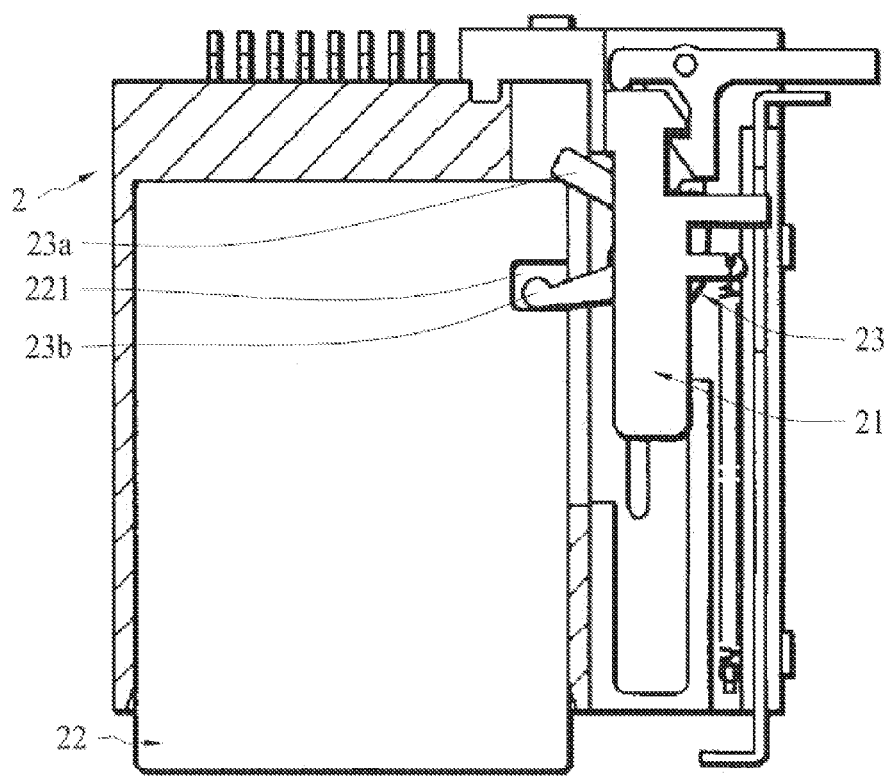
Figure 3:
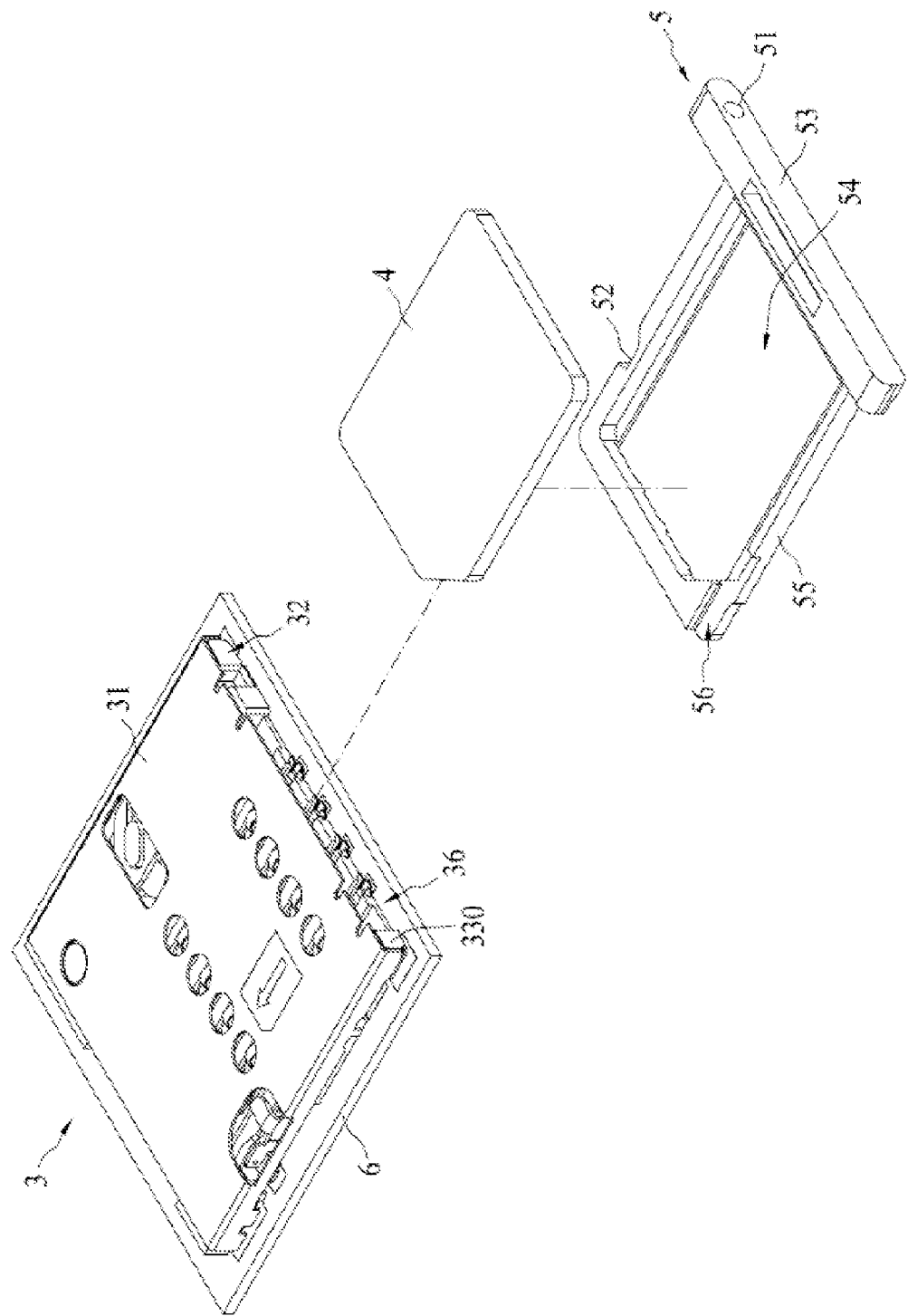
FIG. 3 is a perspective view showing a card connector, an electrical card and a tray according to one embodiment of the present invention.
Figure 4:
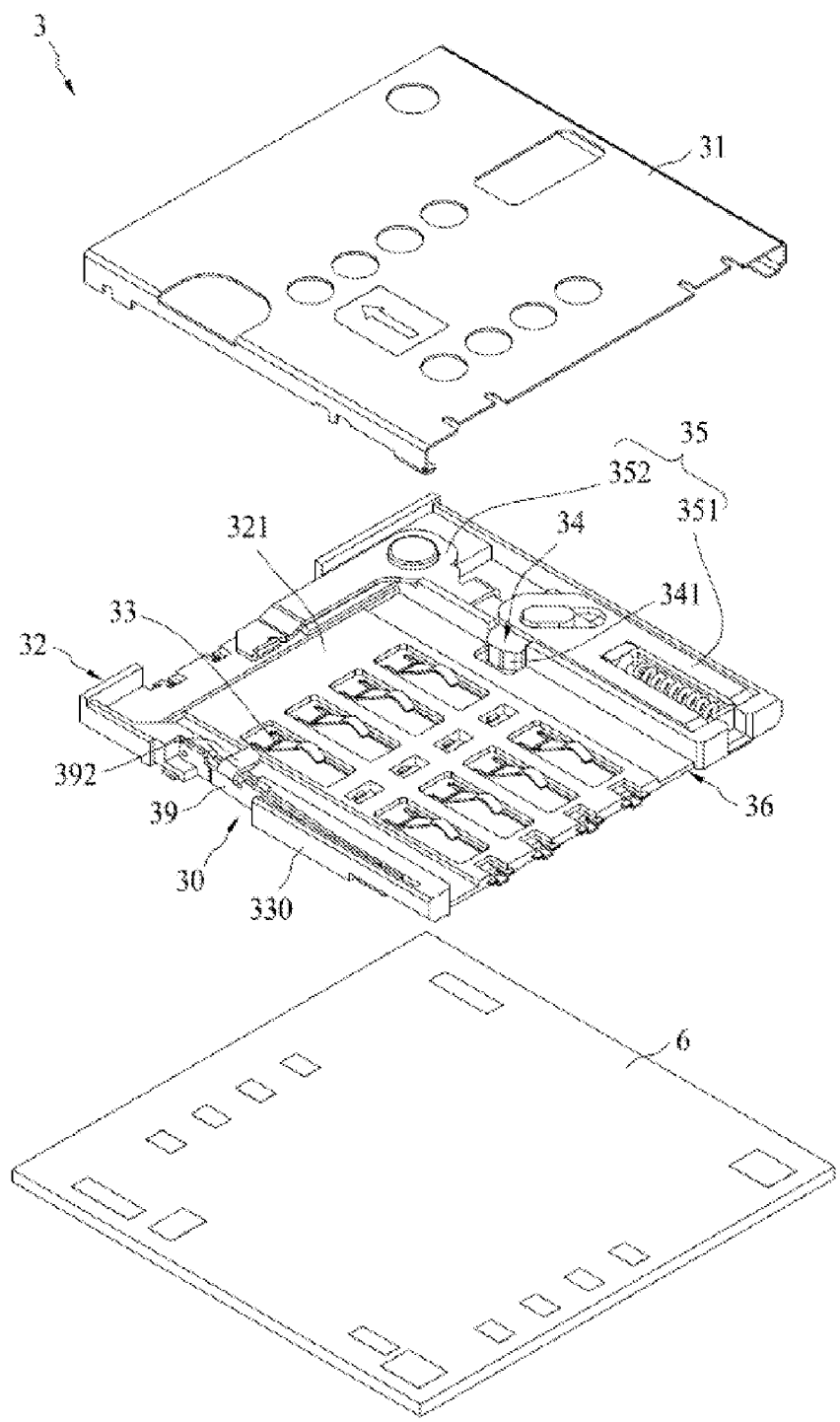
FIG. 4 is an exploded perspective view showing a card connector according to one embodiment of the present invention.

FIG. 3 is a perspective view showing an embodiment of a card connector 3, an electrical card 4 and a tray 5. FIG. 4 is an exploded perspective view of an embodiment of a card connector 3. Referring to FIGS. 3 and 4, the card connector 3 comprises a main body 32 having a front opening 36 and a side portion 330 defining a side of the front opening 36, a cover element 31 covering the main body 32, a plurality of terminals 33 attached to (for example, insert molded with) the main body 32, a detective switch 30 including a spring member 39 for detection of an inserted electrical card 4, and a tray 5 including a side wall 55 for defining a card-holding space 54 for receiving an electrical card 4 and a breach region 56 formed on the side wall 55 of the tray 5.

Figure 5:
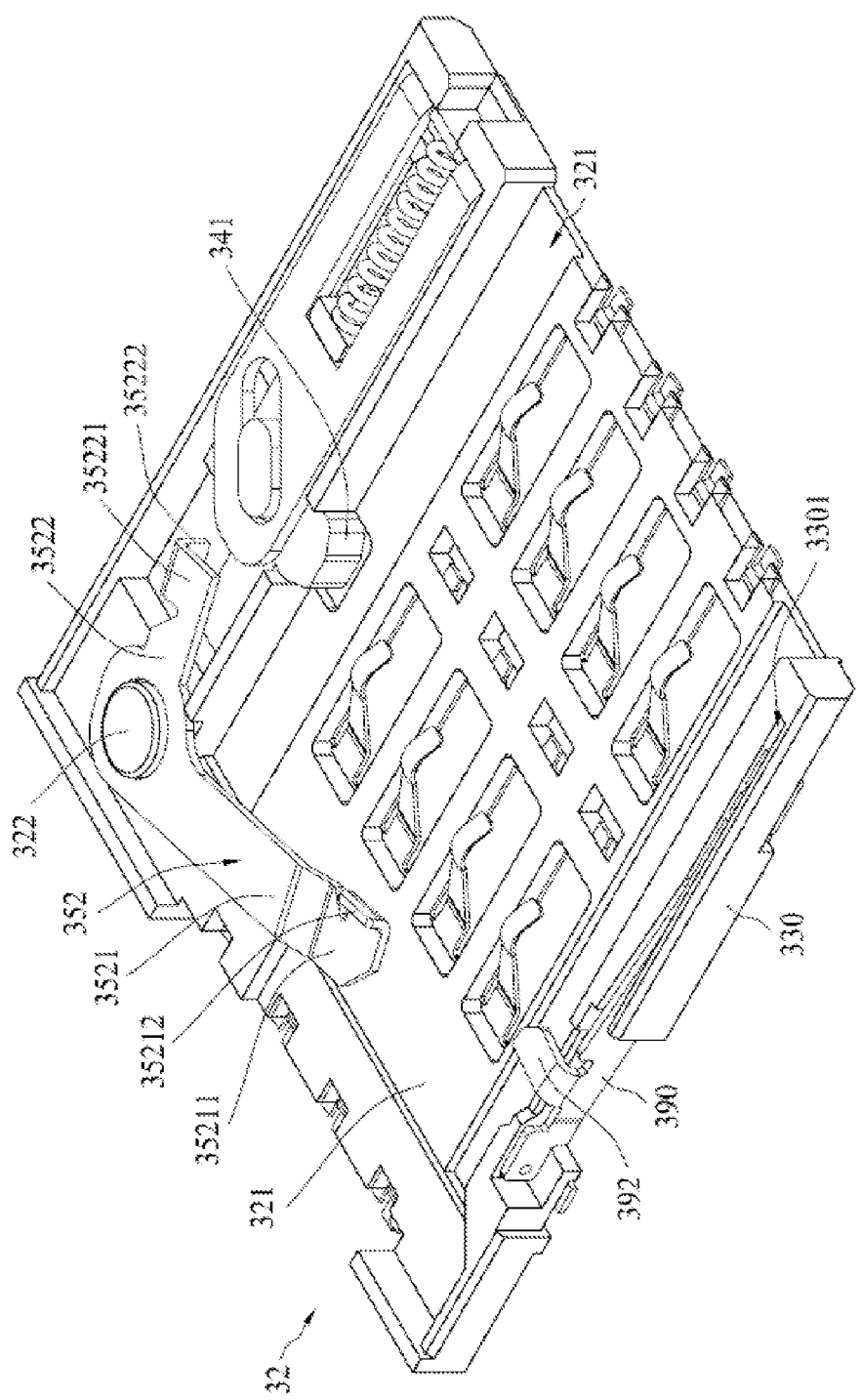
FIG. 5 is a perspective view showing the status of the levering member and the card ejecting mechanism of a card connector when no tray is inserted according to one embodiment of the present invention.
Figure 6:
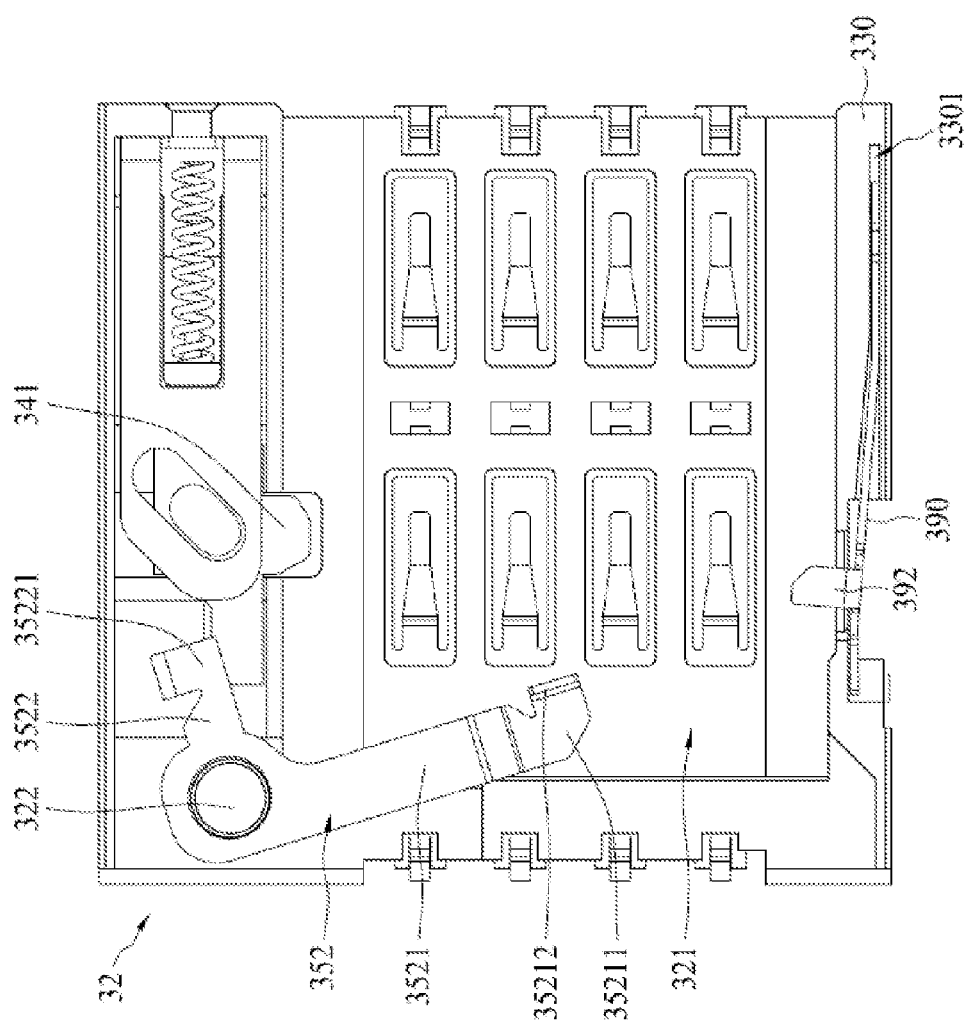
FIG. 6 is a top view of the embodiment of FIG. 5.

Referring to FIGS. 5 and 6, the spring member 39 of the detective switch 30 can be attached to the side portion 330, and can be elastically deflected toward or away from the receiving space 321 formed on the main body 32 for receiving an inserted tray 5. The spring member 39 includes a press portion 392 configured to extend toward the receiving space 321 formed on the main body 32 and further into the card-holding space 54 of an inserted tray 5 through the breach region 56, such that the press portion 392 can engage the electrical card 4 received in the inserted tray 5. Further, the breach region 56 is additionally configured to prevent interference between the press portion 392 of spring member 39 and the tray 5 during the insertion of the tray 5. The card connector 3 can receive a tray 5 carrying an electrical card 4, and can be mountable on a printed circuit board 6. The assembled cover member 31 and main body 32 form a front opening 36 through which the electrical card 4 or the tray 5 is inserted. In one embodiment, the card locking element 34 is rigid, not elastic, so that an inserted tray 5 can be firmly held.

Figure 7:
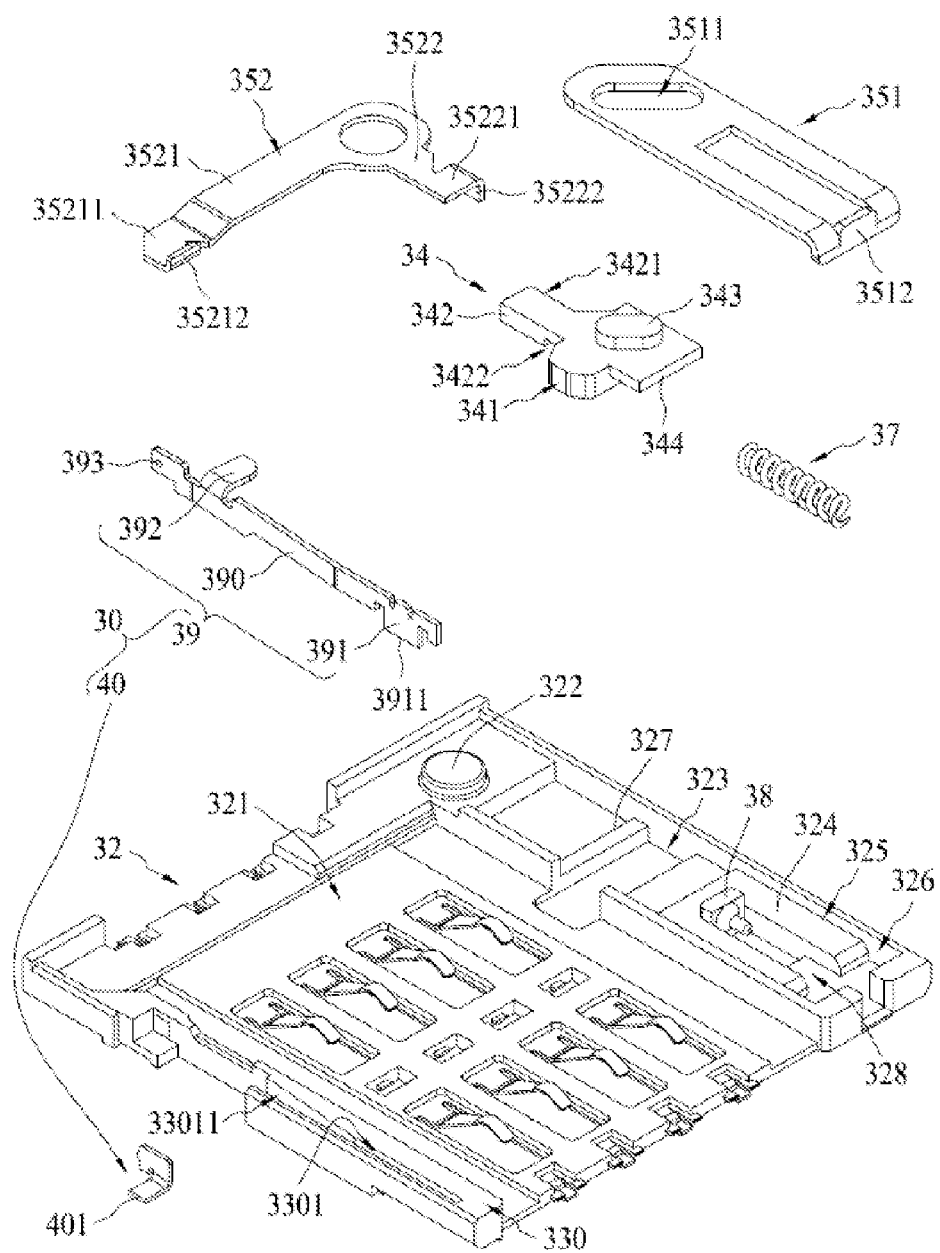
FIG. 7 is an exploded perspective view with the parts separated of the embodiment of FIG. 5.

Referring to FIG. 7, the spring member 39 may comprise a flexible arm portion 390, which can be in strip form. The press portion 392 connects to an edge of the flexible arm portion 390 and is bent toward the receiving space 321 formed on the main body 32. A contact member 40 can be provided in accordance with the spring member 39. The contact member 40 and the spring member 39 can cooperate for detection of the insertion of an electrical card 4.

Referring to FIGS. 5 to 7, the side portion 330 includes a slit 3301 formed on an upper surface of the side portion 330. The spring member 39 is inserted in a downward direction, and a portion of the flexible arm portion 390 is received in the slit 3301. The slit 3301 can include a tapered section 33011, which is configured to allow the flexible arm portion 390 to have sufficient space to elastically deflect.

As can be appreciated, the levering member 352, pivoted on a pivot 322, comprises a first arm part 3521 and a second arm part 3522. The first arm part 3521 extends transversely at the rear of the main body 32 and includes a first end portion 35211 having a push tab 35212 that extends upward and can be swung into the receiving space 321 to eject an inserted tray 5. The second arm part 3522 can extend beside the receiving space 321, including a second end section 35221 having a tab portion 35222.

Referring to FIG. 7, the spring member 39 may comprise a fixing portion 391 and a touching portion 393. The fixing portion 391 can be at an end of the spring member 39 and the touching portion 393 can be at another end of the spring member 39. The fixing portion is held by the slit 3301 so as to fasten the spring member 39. The bottom end 3911 of the fixing portion 391 can be soldered onto a printed circuit board for connecting a circuit of the printed circuit board. Another touching portion 393 is freely moved when the flexible arm portion 390 is deflected. In one embodiment, the press portion 392 is disposed close to the free touching portion 393.

Figure 8:
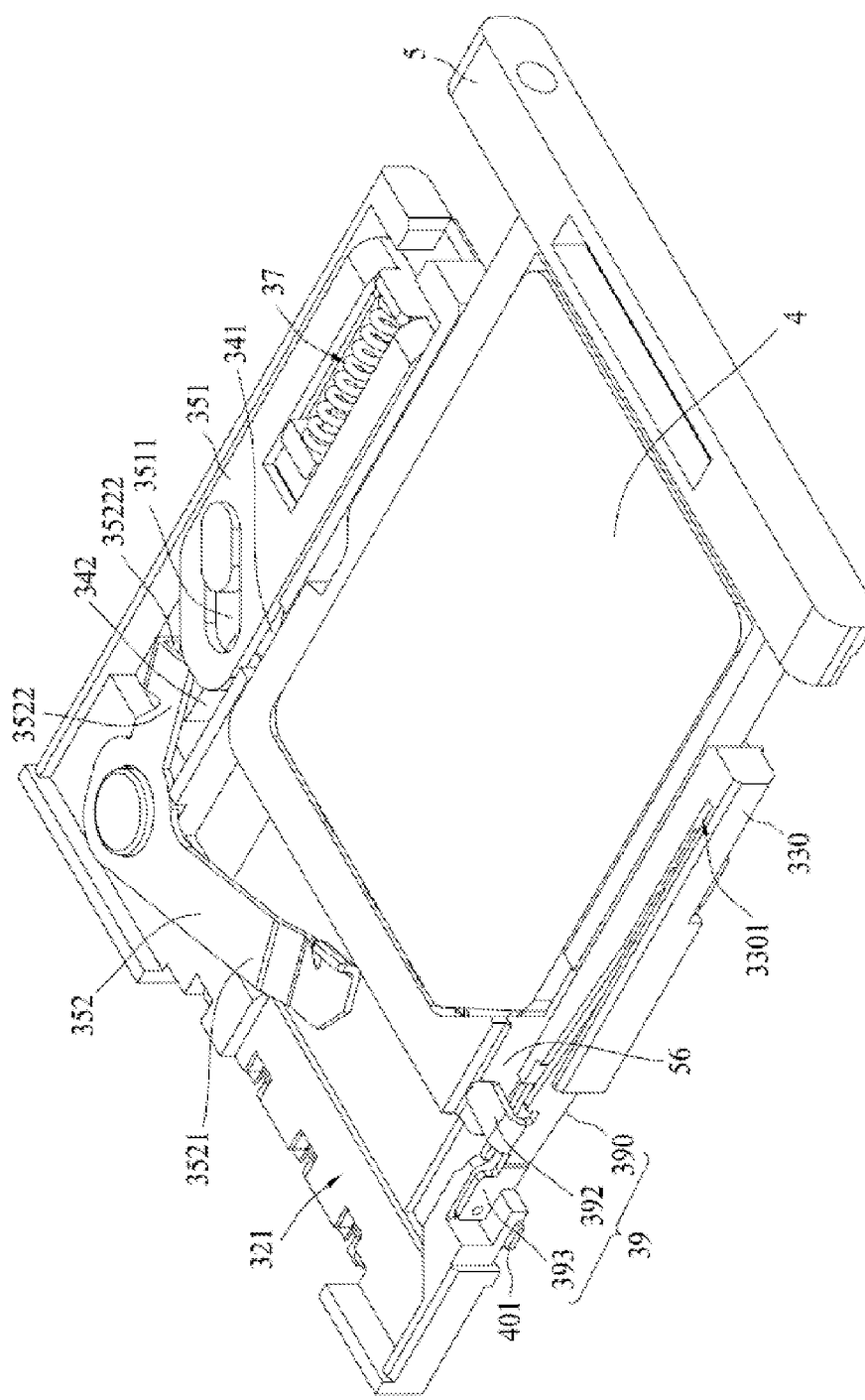
FIG. 8 is a perspective view showing a tray inserted into an electrical card connector according to one embodiment of the present invention.

The contact member 40 can be included in the detective switch 30. The contact member 40 is disposed on the side portion 330, adjacent to the touching portion 393 of the flexible arm portion 390. The contact member 40 can have a soldering portion 401. In one embodiment, the contact member 40 can have a barb and be inserted into the main body 32 with the soldering portion 401 extending below the main body 32, as shown in FIG. 8, for being soldered onto a printed circuit board for connecting a circuit of the printed circuit board. The contact member 40 can be, in an alternative embodiment, insert-molded with the main body 32 with the soldering portion 401 extending below the main body 32, as shown in FIG. 8, for being soldered onto a printed circuit board for connecting a circuit of the printed circuit board. In the present embodiment, as shown in FIGS. 8 and 9, when the press portion 392 does not contact an electrical card 4, the touching portion 393 of the flexible arm portion 390 contacts the contact member 40.

In an alternative embodiment, the cover element 31 is made of electrically conductive material, can connect to a circuit of a printed circuit board, and has a contact member extending adjacent to the touching portion 393 of the flexible arm portion 390. When the press portion 392 does not contact an electrical card 4, the touching portion 393 of the flexible arm portion 390 contacts the contact member of the cover element 31.

Figure 9:
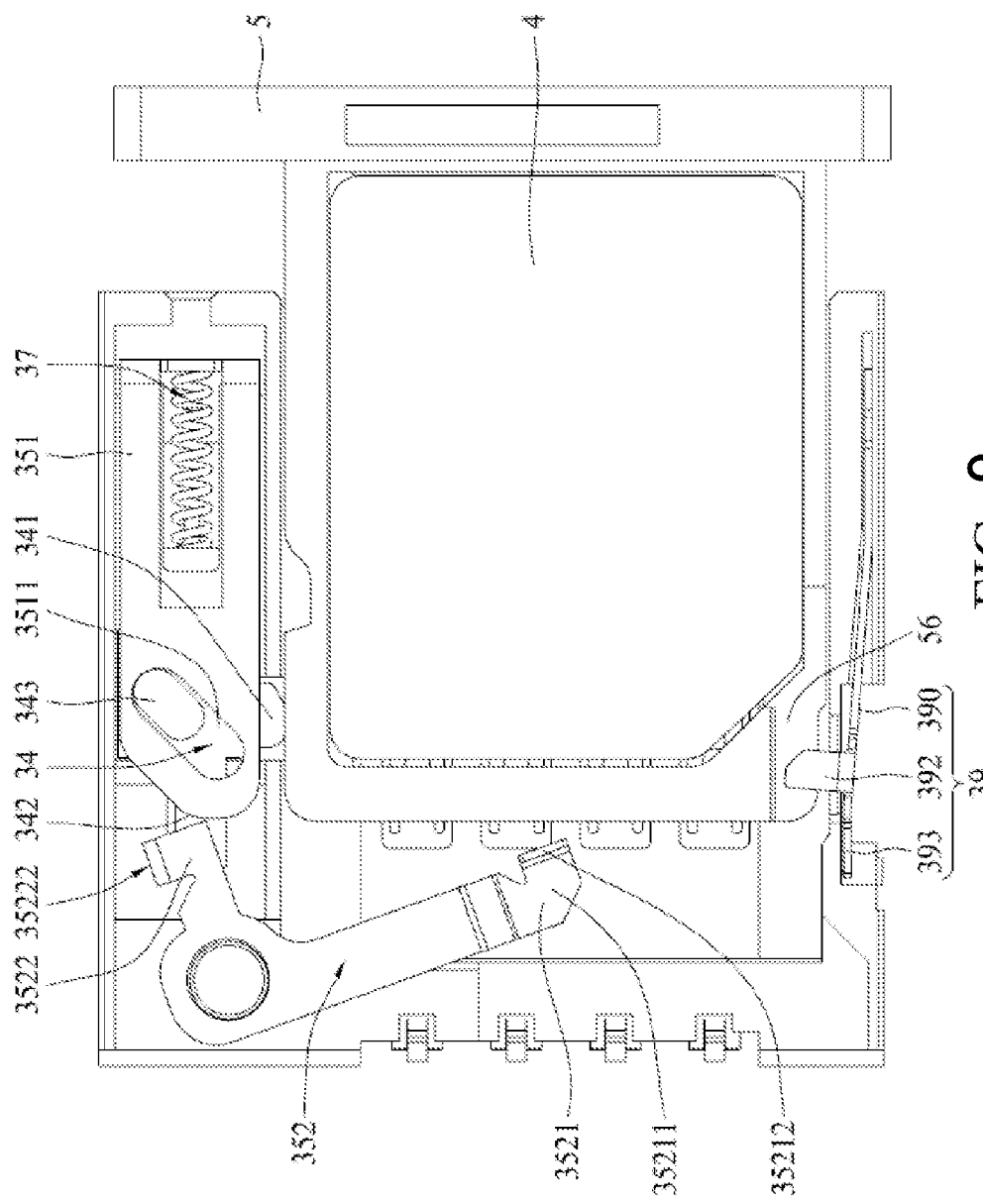
FIG. 9 is a top view of the embodiment of FIG. 8.
Figure 13:
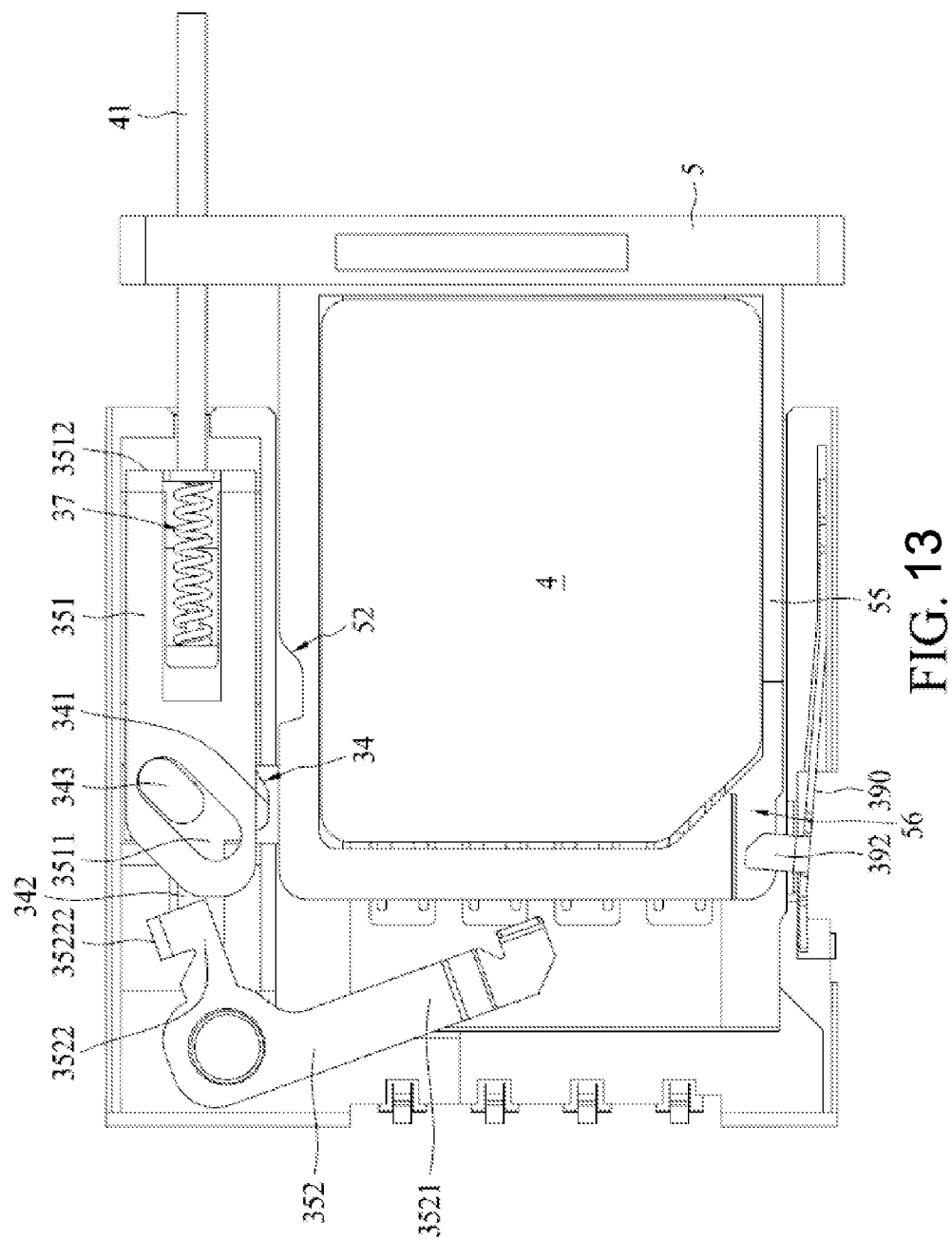
FIG. 13 is a top view of the embodiment of FIG. 12.

As shown in FIGS. 6, 7, 9 and 13, the main body 32 includes a recessed area 323 transversely extending on the main body 32. A bottom portion of the recessed area 323 extends under the receiving space 321. The bottom of the locking portion 341 is received in the recessed area 323. As such, the movement of the locking portion 341 between a locking position as shown in FIG. 6 and an unlocking position as shown in FIG. 9 or FIG. 13 is confined by the recessed area 323. In another embodiment, the main body 32 does not have a recessed area 323 for receiving the bottom of the locking portion 341.

In particular, the locking portion 341 includes a front corner and a rear corner both formed on the peripheral surface of the locking portion 341. The front corner is a cut corner or a round corner so that when the tray 5 engages the front corner of the locking portion 341, the tray 5 can easily move along the front corner. The rear corner is a cut corner or a round corner so that when the tray 5 is moved outward, the tray 5 can easily move along the rear corner.

The card locking element 34 further comprises an operating portion 342 extending toward the second arm part 3522 and engaging with the second arm part 3522 for linked movement therewith. Specifically, the operating portion 342 includes a side 3421 opposite the receiving space 321, and the tab portion 35222 of the second arm part 3522 extends adjacent to the side 3421 of the operating portion 342 such that when the locking portion 341 is moved toward the unlocking position, the operating portion 342 can push the tab portion 35222 of the second arm part 3522 to rotate the levering member 352. In particular, the operating portion 342 has a rectangular cross section, and the tab portion 35222 of the second end section 35221 is bent downward to form an L-shape such that the second end section 35221 extends around the outside upper corner of the operating portion 342.

In addition, a groove 3422 is formed on the bottom of the operating portion 342, and an elongated projection 327 is correspondingly formed on the main body 32, mated with the groove 3422, and extending along the recessed area 323. The elongated projection 327 passes through the groove 3422 when the card locking element 34 is assembled to the main body 32. The cooperation between the groove 3422 and the elongated projection 327 can further constrain or guide the movement of the card locking element 34.

Furthermore, the card locking element 34 comprises a plate portion 344 movable within a space defined by a bottom surface of the main body 32 and the actuator 351. The plate portion 344 facilitates the proper movement of the card locking element 34.

Referring to FIGS. 12 to 15, the breach region 56 on the side wall 55 of the tray 5 corresponds to the press portion 392 of the spring member 39. The breach region 56 is configured such that the tray 5 will not interfere with the press portion 392 of the spring member 39 either during the insertion of an empty tray 5 or when the empty tray 5 is completely inserted. As such, no signal is generated if an empty tray 5 is inserted.

Figure 10:
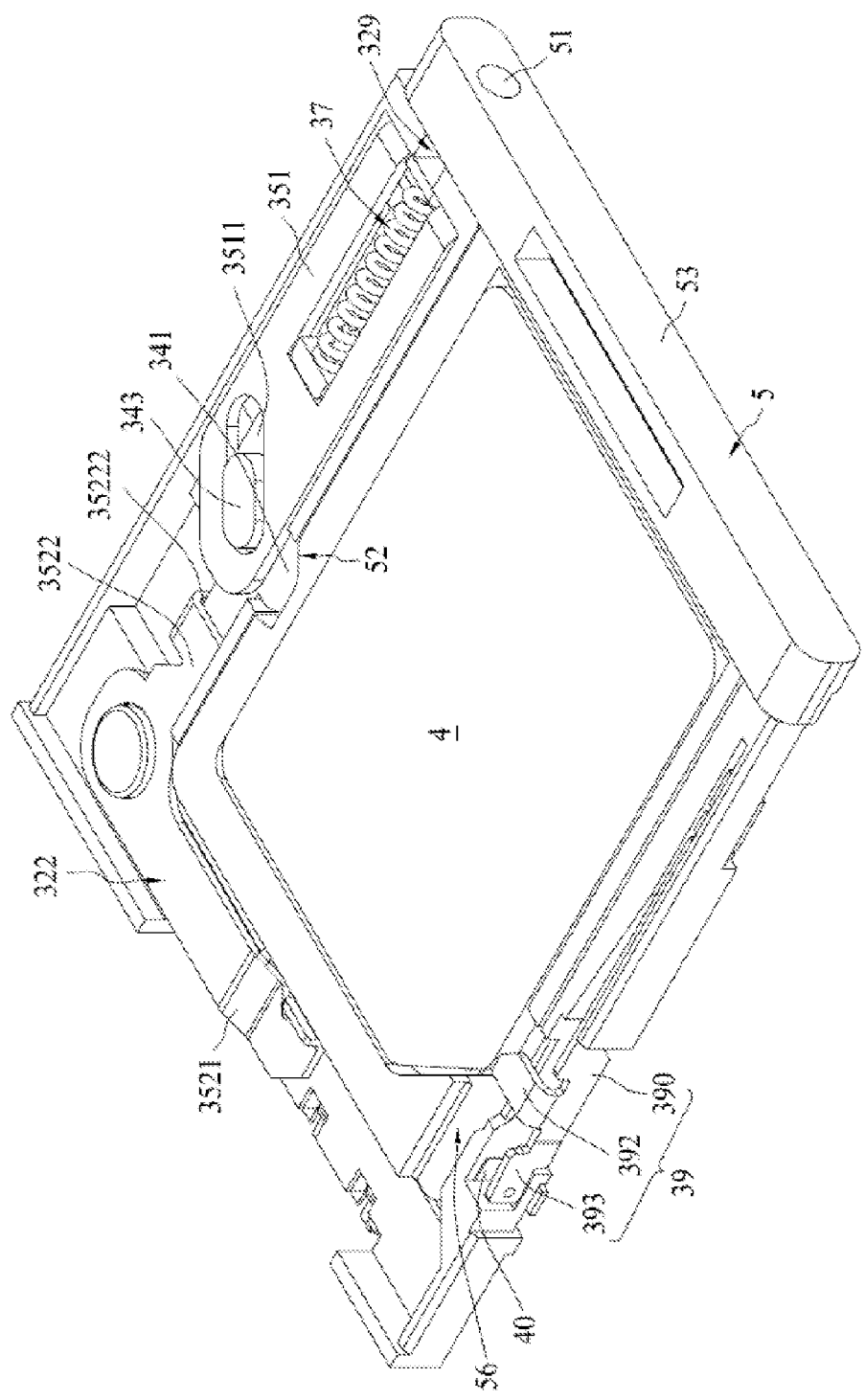
FIG. 10 is a perspective view showing a card connector with an inserted tray according to one embodiment of the present invention.
Figure 11:
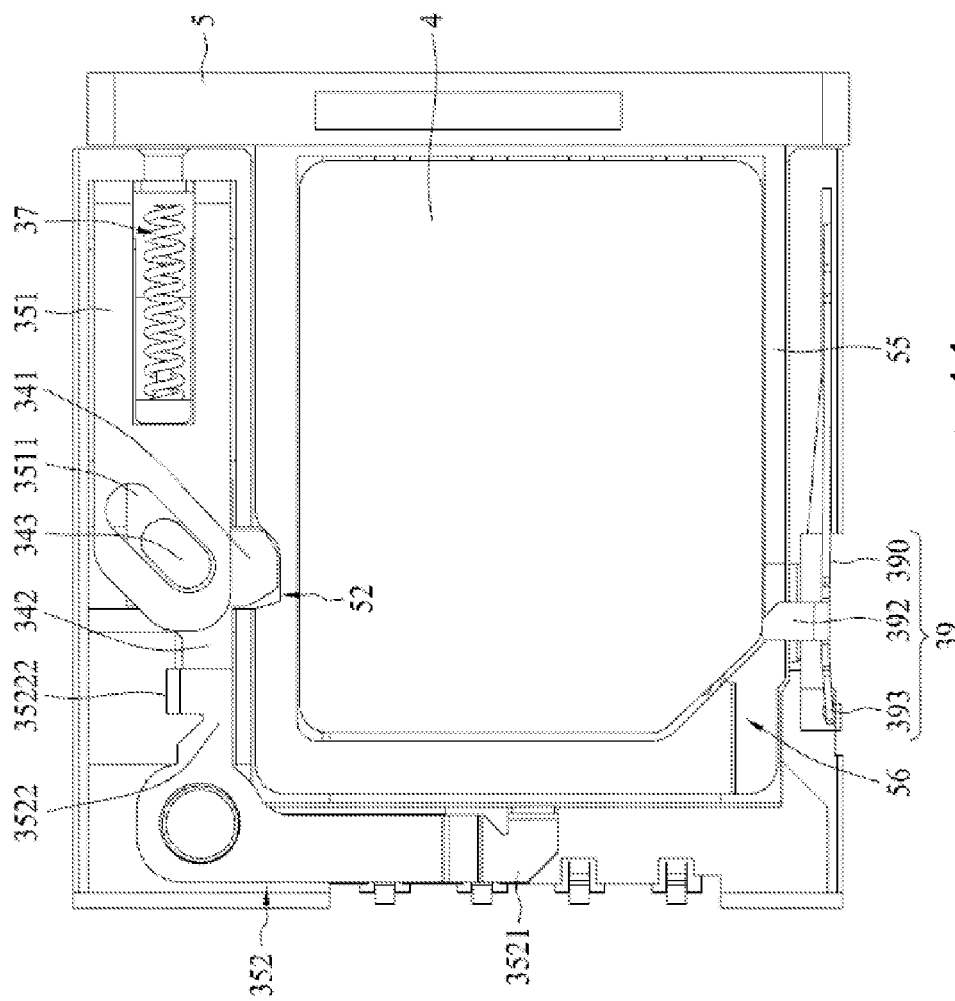
FIG. 11 is a top view of the embodiment of FIG. 10.
Figure 14:
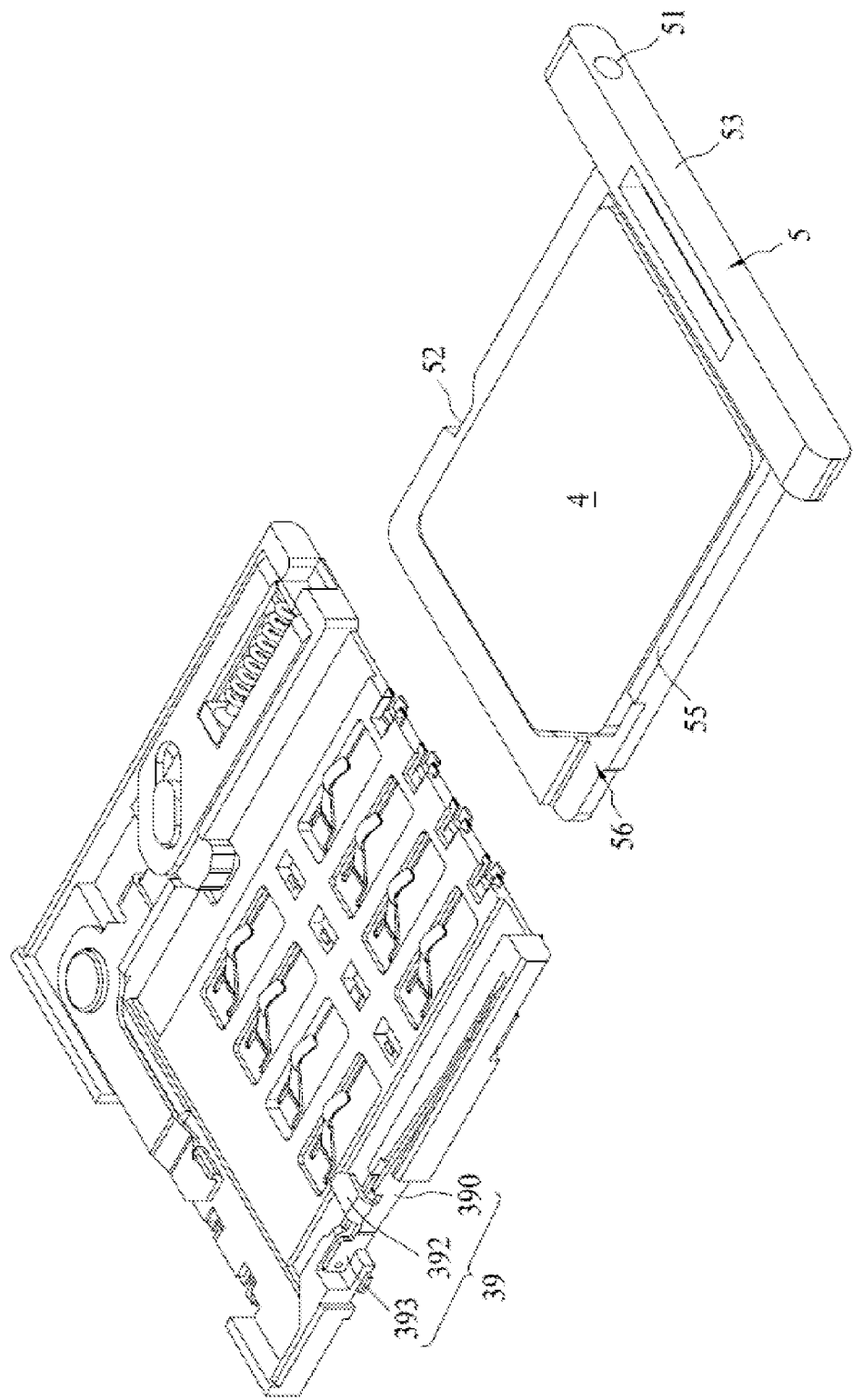
FIG. 14 is a perspective view showing a card connector and a tray carrying an electrical card according to one embodiment of the present invention.

The press portion 392 of the spring member 39 can be pushed by an electrical card 4 received in an inserted tray 5. In the present embodiment, the breach region 56 is formed on a rear corner of the tray 5 to reveal a corresponding corner portion of the electrical card 4 as shown in FIG. 14. As shown in FIGS. 10 and 11, when a tray 5 carrying an electrical card 4 is inserted, the corner portion of the electrical card 4 can contact the leading edge of the press portion 392, pushing the press portion 392 outward, deflecting the flexible arm portion 390, and moving the touching portion 393 away from the contact member 40. After the touching portion 393 completely disengages from the contact member 40, a card inserted signal is generated.

In one embodiment, the press portion 392 of the spring member 39 may include a cut corner facing the front opening 36 such that the press portion 392 can be properly pushed by the corner portion of the electrical card 4.

Referring back to FIGS. 4 to 7, the card connector 3 can further comprise a card locking element 34 including a locking portion 341 configured to be located in the receiving space 321 when the card locking element 34 is in a locking position, and also including a card ejecting mechanism 35 including an actuator 351 movable in a back and forth direction and a levering member 352 mounted adjacent to the rear of the receiving space 321. The card connector 3 can be mountable on a printed circuit board 6. In one embodiment, the card locking element 34 is rigid, not elastic, so that an inserted tray 5 can be firmly held.

As can be appreciated, the levering member 352, pivoted on a pivot 322, comprises a first arm part 3521 and a second arm part 3522. The first arm part 3521 extends transversely at the rear of the main body 32 and includes a first end portion 35211 having a push tab 35212 that extends upward and can be swung into the receiving space 321 to eject an inserted tray 5. The second arm part 3522 can extend beside the receiving space 321, including a second end section 35221 having a tab portion 35222.

As shown in FIGS. 6, 7, 9 and 13, the main body 32 includes a recessed area 323 transversely extending along the main body 32. A bottom portion of the recessed area 323 extends under the receiving space 321. The bottom of the locking portion 341 is received in the recessed area 323. As such, the movement of the locking portion 341 between a locking position as shown in FIG. 6 and an unlocking position as shown in FIG. 9 or FIG. 13 is confined by the recessed area 323. In another embodiment, the main body 32 does not have a recessed area 323 for receiving the bottom of the locking portion 341.

In particular, the locking portion 341 includes a front corner and a rear corner both formed on the peripheral surface of the locking portion 341. The front corner is a cut corner or a round corner so that when the tray 5 engages the front corner of the locking portion 341, the tray 5 can easily move along the front corner. The rear corner is a cut corner or a round corner so that when the tray 5 is moved outward, the tray 5 can easily move along the rear corner.

The card locking element 34 further comprises an operating portion 342 extending toward the second arm part 3522 and engaging with the second arm part 3522 for linked movement therewith. Specifically, the operating portion 342 includes a side 3421 opposite the receiving space 321, and the tab portion 35222 of the second arm part 3522 extends adjacent to the side 3421 of the operating portion 342 such that when the locking portion 341 is moved toward the unlocking position, the operating portion 342 can push the tab portion 35222 of the second arm part 3522 to rotate the levering member 352. In particular, the operating portion 342 has a rectangular cross section, and the tab portion 35222 of the second end section 35221 is bent downward to form an L shape such that the second end section 35221 extends around the outside upper corner of the operating portion 342.

In addition, a groove 3422 is formed on the bottom of the operating portion 342, and an elongated projection 327 is correspondingly formed on the main body 32, mated with the groove 3422 and extending along the recessed area 323. The elongated projection 327 passes through the groove 3422 when the card locking element 34 is assembled to the main body 32. The interaction between the groove 3422 and the elongated projection 327 can further constrain or guide the movement of the card locking element 34.

Furthermore, the card locking element 34 comprises a plate portion 344 movable within a space defined by a bottom surface of the main body 32 and the actuator 351. The plate portion 344 facilitates the proper movement of the card locking element 34.

Referring to FIGS. 7 to 11, the actuator 351 is movable between an outward position as shown in FIGS. 10 and 11 and an inward position as shown in FIGS. 8 and 9 along a direction parallel to the insertion direction of the tray 5. The actuator 351 can move the card locking element 34. The card locking element 34 comprises a first interacting portion 343, and the actuator 351 comprises a second interacting portion 3511. The first and second interacting portions 343 and 3551 are engaged for linked movement of the card locking element 34 and the actuator 351, allowing the movement of the card locking element 34 between the locking position and the unlocking position simultaneous with the movement of the actuator 351 between the outward position and the inward position. The interaction of the first and second interacting portions 343 and 3551 can cause the card locking element 34 and the actuator 351 to move in different directions, for example, two perpendicular directions.

As shown in FIG. 7, in one embodiment, the first interacting portion 343 of the card locking element 34 comprises a pin, and the second interacting portion 3511 of the actuator 351 comprises a slot inclined at an angle, such as 45 degrees, relative to the moving direction of the actuator 351. The slot has two elongated slot edges. When the actuator 351 is moved, one elongated slot edge contacts the pin, pushing the pin to move along the same elongated slot edge so as to move the card locking element 34. Alternatively, when the pin is moved, the pin pushes another elongated slot edge, moving along the same elongated slot edge so as to move the actuator 351. In one embodiment, the pin can have an elliptic cross section.

The actuator 351 can have a plate-like shape, confined in a concave space 325, and moving over a platform 324. The actuator 351 can further have a bent end 3512 restrained in a recessed area 326 included in the main body 32 and disposed adjacent to the front of the main body 32 such that the movement of the actuator 351 can be restricted.

Referring to FIGS. 7 to 11, the card connector 3 further comprises an elastic member 37. The elastic member 37 provides an elastic force counteracting a force moving the actuator 351 inward, and moves the actuator 351 outward when the force is removed. In one embodiment, the elastic member 37 comprises a spring.

In particular, a channel 328 is formed on the platform 324, communicating with the recessed area 326. A supporting member 38 is provided at the end of the channel 328 for engaging with an end of the elastic member 37. The supporting member 38 can have a pin configured to protrude into the elastic member 37. Another end of the elastic member 37 engages the bent end 3512 of the actuator 351.

FIGS. 8 to 11 are used herein to demonstrate the operation of the card locking element 34 and the card ejecting mechanism 35 during the insertion of a tray 5 carrying an electrical card 4. The operation is similar when a single, different size of electrical card is inserted. As shown in FIGS. 8 and 9, after the inserting tray 5 contacts the locking portion 341 of the card locking element 34, the locking portion 341 is pushed and the card locking element 34 is moved away from the receiving space 321 until the tip of the locking portion 341 is against the right edge of the tray 5. During the movement of the card locking element 34, the first interacting portion 343 of the card locking element 34, which is a pin in the present embodiment, pushes one elongated slot edge, close to the levering member 352, of the second interacting portion 3511, a slot in the present embodiment, and moves along the same slot edge such that the actuator 351 is moved inward and the elastic member 37 is compressed.

Referring to FIGS. 10 and 11, when the rear edge of the tray 5 is close to the rear of the main body 32, the rear edge touches the first arm part 3521 of the levering member 352 and rotates the levering member 352 until the tray 5 is completely inserted. At some moment during the insertion process, the notch 52 of the tray 5 encounters the locking portion 341 of the locking element 34. The locking element 34 is moved toward the notch 52 due to the elastic force produced by the compressed elastic member 37. Without the counterforce from the right edge of the tray 5 to the locking element 34, the elastic force produced by the compressed elastic member 37 moves the actuator 351 and the elongated slot edge, close to the levering member 352, of the second interacting portion 3511 pushes the first interacting portion 343 of the card locking element 34, applying a force, a portion of which moves the locking element 34 toward the receiving space 321 until the locking portion 341 of the locking element 34 enters the notch 52. Because the locking portion 341 of the locking element 34 moves into and away from the receiving space 321 linearly, the notch 52 and the locking portion 341 can be fitted closely to each other so that the tray 5 can be securely held after it is inserted.

Figure 12:
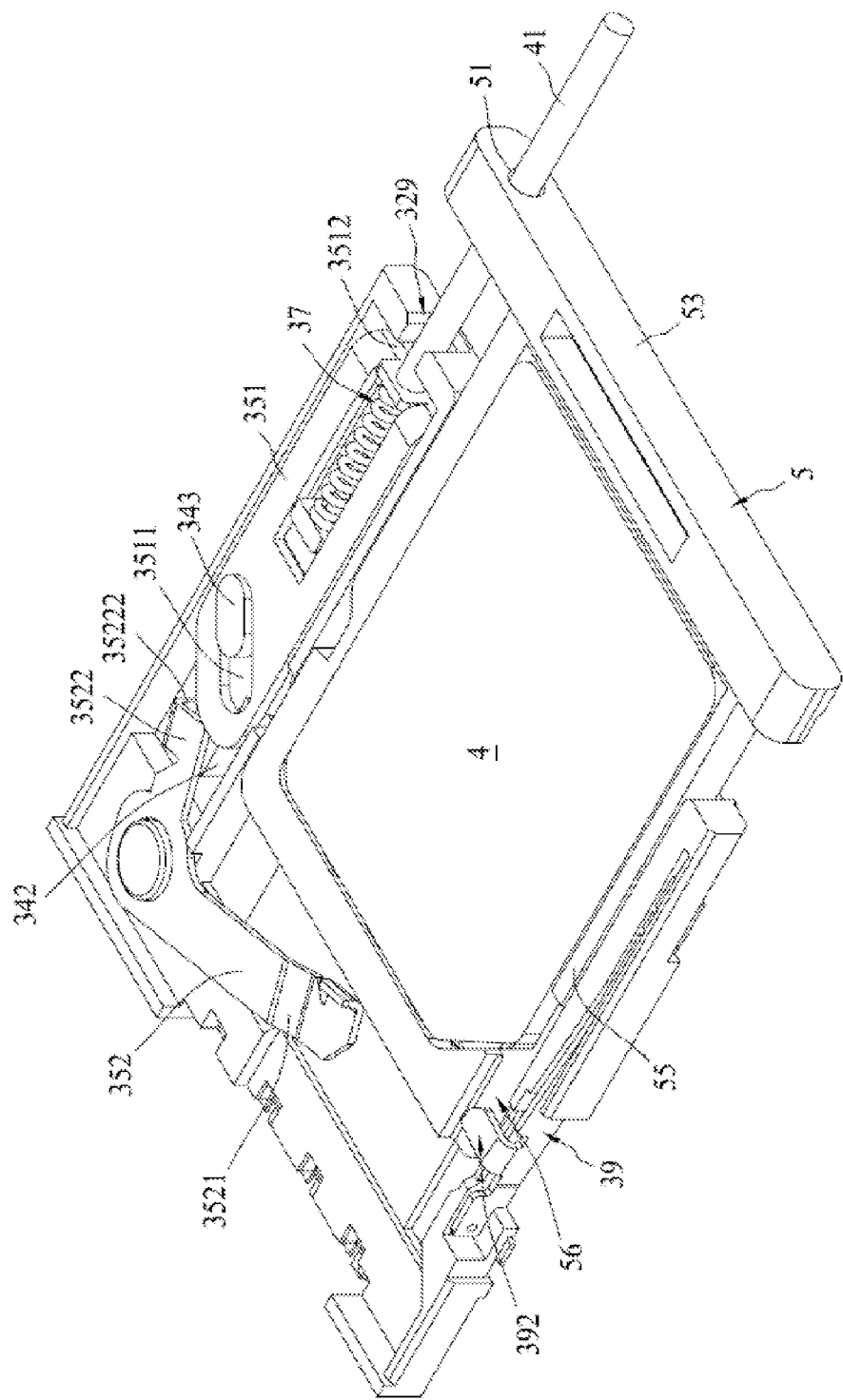
FIG. 12 is a view showing a tray being rejected from a card connector by a rod member according to one embodiment of the present invention.

Referring to FIGS. 10, 12 and 13, the main body 32 has an opening 329 formed on a front side wall of the main body 32 to expose the bent end 3512 of the actuator 351. The tray 5 has a bar member 53 defining a side of the receiving space 321. A hole 51 is formed on the bar member 53, corresponding to the opening 329 of the main body 32. To eject the tray 5, a rod member 41 is inserted into the opening 329 and the hole 51, and pushes the actuator 351. The actuator 351 is moved inward, compressing the elastic member 37. Simultaneously, the elongated slot edge of the second interacting portion 3511 of the actuator 351 pushes the first interacting portion 343 of the card locking element 34 and moves the card locking element 34 away from the receiving space 321; meanwhile, the operating portion 342 of the card locking element 34 pushes the tab portion 35222 of the levering member 352, rotating the levering member 352. The push tab 35212 of the first arm part 3521 of the rotating levering member 352 pushes the rear edge of the tray 5 outward. As the locking portion 341 of the card locking element 34 disengages from the notch 52 of the tray 5, the tray 5 is moved outward until the first interacting portion 343 is moved to the end of the second interacting portion 3511, close to an external side wall of the main body 32.

Figure 15:
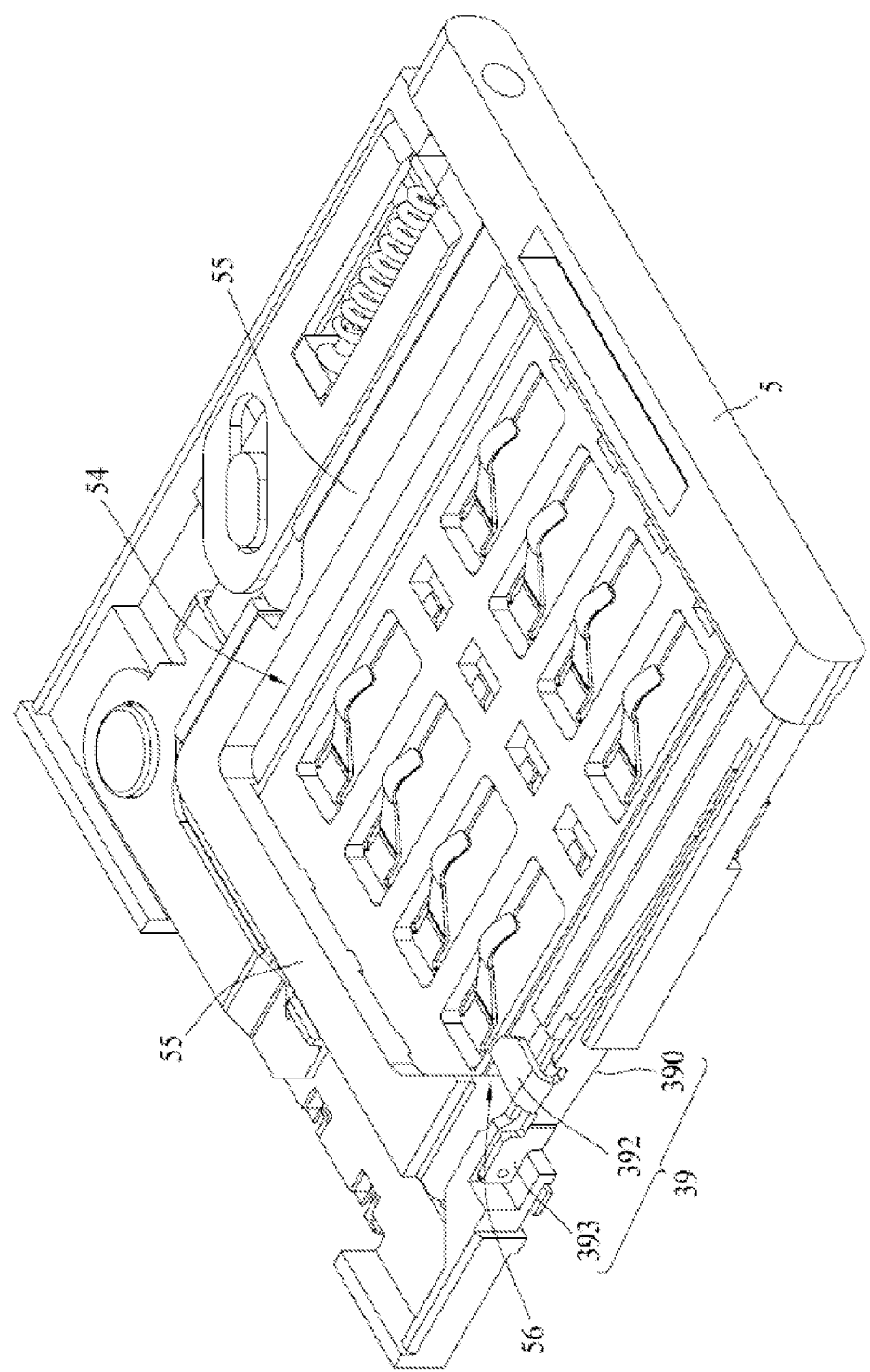
FIG. 15 shows an electrical card connector inserted with an empty tray according to one embodiment of the present invention.

Referring to FIGS. 7, 14 and 15, the card connector 3 further comprises a detective member 39 and a detective contact 40. The detective contact 40 is attached to the main body 32 and solderable to the printed circuit board 6. The detective member 39 is elastically deformable, having a touch portion 392 protruding into the receiving space 321 for engaging with an inserted electrical card 4 carried by the tray 5, one end portion 391 configured to be held by the main body 32 and solderable to the printed circuit board 6, and another end portion 393 configured to contact the detective contact 40 when the detective member 39 is not deformed. The tray 5 has a card-holding space 54 surrounded by a side wall 55. A breach 56 is formed on the side wall 55, corresponding to the touch portion 392, and configured to prevent the touch portion 392 of the detective member 39 from interfering with an inserted empty tray as shown in FIG. 15. As shown in FIGS. 10 and 11, when a tray 5 carrying an electrical card 4 is inserted, the inserted electrical card 4 pushes the touch portion 392 of the detective member 39, deflecting the detective member 39 outward, disengaging the end portion 393 of the detective member 39 from the detective contact 40.

Although the card locking element 34 and the card ejecting mechanism 35 are applied, in the above embodiments, in an alternative embodiment a card connector 3 receiving a tray, the same card locking element 34 and card ejecting mechanism 35 can also be employed in a card connector directly receiving a card.

In one embodiment, a card connector comprises a card locking element for latching an inserted tray receiving an electrical card and a card ejecting mechanism for facilitating the movement of the card locking element between a locking position and an unlocking position. The card locking element can be rigid so that an inserted tray can be firmly held. In addition, the card locking element is moved linearly to engage with the notch on a tray so that the tray is not loosely held. In another embodiment, the above card locking element can also be employed in a card connector that directly receives a different electrical card. The card locking element latches the electrical card and the card ejecting mechanism for facilitating the movement of the card locking element between a locking position and an unlocking position.

The above-described embodiments are intended to be illustrative only. Numerous alternative embodiments may be devised by persons skilled in the art without departing from the scope of the following claims.

What is claimed is:

1. A card connector, comprising:
   a main body having a receiving space;
   a plurality of terminals attached to the main body;
   a card locking element including a locking portion configured to be located in the receiving space when the card locking element is in a locking position, an operating portion, and a first interacting portion; and
   a card ejecting mechanism comprising:
   an actuator movable between an outward position and an inward position, having a second interacting portion configured to engage with the first interacting portion for linked movement of the card locking element and the actuator; and
   a levering member pivoted adjacent the rear of the receiving space, including a first arm part and a second arm part, the second arm part having a second end section extending adjacent to the operating portion of the card locking element, the first arm part having a first end portion that can be swung into the receiving space when the second end section is pushed by the operating portion of the card locking element;
   wherein the first and second interacting portions allow the linear movement of the card locking element between the locking position and an unlocking position simultaneous with the movement of the actuator between the outward position and the inward position.

2. The card connector of claim 1, further comprising an elastic member providing an elastic force counteracting a force moving the actuator inward, and moving the actuator outward when the force is removed.

3. The card connector of claim 2, wherein the second interacting portion comprises a slot inclined at an angle of 45 degrees relative to the moving direction of the actuator, and the first interacting portion comprises a pin movable in the slot.

4. The card connector of claim 3, wherein the card locking element further comprises a plate portion movable within a space defined by a bottom surface of the main body and the actuator.

5. The card connector of claim 4, wherein the operating portion of the card locking element comprises a groove and the main body comprises a projection passing through the groove.

6. The card connector of claim 5, wherein the main body comprises a concave space, and the actuator moves in the concave space.

7. The card connector of claim 6, wherein the main body comprises a channel formed in the concave space, and the elastic member is in the channel and wherein the operating portion of the card locking element includes a side opposite the receiving space, and the second end section of the levering member includes a tab portion disposed adjacent to the side.

8. The card connector of claim 7, wherein the main body includes a recessed area, and the actuator includes a bent end restrictedly moved in the recessed area and wherein the main body includes an opening formed on a front side wall of the main body to expose the bent end of the actuator, wherein the actuator is moved inward by pushing the bent end of the actuator through the opening.

9. The card connector of claim 1, wherein the card locking element and the actuator respectively move in two perpendicular directions.

10. The card connector of claim 9, wherein the card locking element is rigid.

11. A card connector, comprising:
a tray having a notch;
a main body having a receiving space for receiving the tray;
a plurality of terminals attached to the main body;
a card locking element including a locking portion configured to be in the notch when the card locking element is in a locking position, an operating portion, and a first interacting portion; and
a card ejecting mechanism comprising:
an actuator movable between an outward position and an inward position, having a second interacting portion configured to engage with the first interacting portion for linked movement of the card locking element and the actuator; and
a levering member pivoted adjacent to the rear of the receiving space, including a first arm part and a second arm part, the second arm part having an second end section extending adjacent to the operating portion of the card locking element, the first arm part having a first end portion that can be swung into the receiving space when the second end section is pushed by the operating portion of the card locking element;
wherein the first and second interacting portions allow the linear movement of the card locking element between the locking position and an unlocking position simultaneous with the movement of the actuator between the outward position and the inward position.

12. The card connector of claim 11, further comprising an elastic member providing an elastic force counteracting a force moving the actuator inward, and moving the actuator outward when the force is removed.

13. The card connector of claim 12, wherein the second interacting portion comprises a slot inclined at an angle of 45 degrees relative to the moving direction of the actuator, and the first interacting portion comprises a pin movable in the slot.

14. The card connector of claim 13, further comprising a detective contact disposed on the main body and a detective member having an end portion and a touch portion protruding into the receiving space for engaging with an inserted electrical card, wherein the detective member is elastically deformable to allow the end portion to move toward and away from the detective contact.

15. The card connector of claim 14, wherein the tray comprises a side wall surrounding a card-holding space for receiving an electrical card and a breach formed on the side wall, wherein the breach is configured to prevent the touch portion of the detective member from interfering with an inserted empty tray and wherein the card locking element further comprises a plate portion movable within a space defined by a bottom surface of the main body and the actuator.

16. The card connector of claim 15, wherein the operating portion of the card locking element comprises a groove and the main body comprises a projection passing through the groove.

17. The card connector of claim 16, wherein the main body comprises a concave space, wherein the actuator moves in the concave space and wherein the main body comprises a channel formed in the concave space, and the elastic member is in the channel.

18. The card connector of claim 17, wherein the operating portion of the card locking element includes a side opposite the receiving space, and the second end section of the levering member includes a tab portion disposed adjacent to the side, wherein the main body includes a recessed area, and the actuator includes a bent end restrictedly moved in the recessed area.

19. The card connector of claim 18, wherein the main body includes an opening formed on a front side wall of the main body to expose the bent end of the actuator and the tray includes a bar member and a hole formed on the bar member and corresponding to the opening, wherein the actuator is moved inward by pushing the bent end of the actuator through the opening and the hole.

20. The card connector of claim 11, wherein the card locking element and the actuator respectively move in two perpendicular directions.

21. The card connector of claim 20, wherein the card locking element is rigid.

* * * * *